(12) United States Patent
Jokimies et al.

(10) Patent No.: US 6,611,674 B1
(45) Date of Patent: Aug. 26, 2003

(54) METHOD AND APPARATUS FOR CONTROLLING ENCODING OF A DIGITAL VIDEO SIGNAL ACCORDING TO MONITORED PARAMETERS OF A RADIO FREQUENCY COMMUNICATION SIGNAL

(75) Inventors: Matti Jokimies, Salo (FI); Markus Hakaste, Helsinki (FI); Vesa Lunden, Lempäälä (FI); Petri Jarvinen, Tampere (FI); Marko Luomi, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/370,661

(22) Filed: Aug. 6, 1999

(30) Foreign Application Priority Data

Aug. 7, 1998 (GB) ............................................. 9817292

(51) Int. Cl.[7] ........................ H04B 17/00; H04N 17/02; H04N 11/04
(52) U.S. Cl. ........................ 455/69; 455/67.3; 455/115; 455/126; 348/192; 375/240.07; 375/240.27; 714/774
(58) Field of Search ........................ 375/240.07, 240.02, 375/240.01, 240.24, 240.27; 725/124, 62, 63, 67, 68, 118, 121, 123; 348/180, 193, 192; 455/67.1, 69, 67.3, 522, 226.1, 226.2, 226.3, 115, 68, 126; 370/465; 714/746, 752, 774

(56) References Cited

U.S. PATENT DOCUMENTS

| | | | |
|---|---|---|---|
| 5,278,866 A | 1/1994 | Nonami | 375/227 |
| 5,386,589 A | 1/1995 | Kanai | 455/423 |
| 5,557,639 A | 9/1996 | Heikkila et al. | 375/224 |
| 5,568,200 A | 10/1996 | Pearlstein et al. | 348/466 |
| 5,596,677 A | 1/1997 | Jarvinen et al. | 704/220 |
| 5,699,365 A * | 12/1997 | Klayman et al. | 714/774 |
| 5,742,892 A * | 4/1998 | Chaddha | 725/146 |
| 5,761,223 A * | 6/1998 | Ando et al. | 714/774 |
| 5,835,889 A | 11/1998 | Kapanen | 704/215 |
| 5,854,978 A | 12/1998 | Heidari | 455/418 |
| 5,859,843 A | 1/1999 | Honkasalo et al. | 370/342 |
| 5,870,666 A * | 2/1999 | Tanaka et al. | 455/67.1 |
| 5,893,061 A | 4/1999 | Gortz | 704/262 |
| 5,926,232 A * | 7/1999 | Mangold et al. | 375/240.27 |
| 5,940,439 A * | 8/1999 | Kleider et al. | 455/126 |
| 6,130,880 A * | 10/2000 | Naudus et al. | 370/235 |
| 6,182,264 B1 * | 1/2001 | Ott | 714/774 |

FOREIGN PATENT DOCUMENTS

| | | |
|---|---|---|
| EP | 0 739 139 | 10/1996 |
| EP | 0 771 120 | 5/1997 |
| EP | 0 822 667 | 2/1998 |
| GB | 2 297 885 | 8/1996 |
| GB | 2 306 867 | 5/1997 |
| WO | 97/26744 | 7/1997 |
| WO | 97/28619 | 8/1997 |

OTHER PUBLICATIONS

United Kingdom Search Report.

* cited by examiner

Primary Examiner—William Trost
Assistant Examiner—Rafael Perez-Gutierrez
(74) Attorney, Agent, or Firm—Perman & Green, LLP (57) ABSTRACT

Method and apparatus for controlling the operation of a video codec designed for encoding video data suitable for radio transmission between a network and a mobile station. The invention is particularly applicable where the transmission errors are unpredictable, and entails monitoring one or more parameters of the received or transmitted signal and providing a feedback signal based on the monitored signal, the feedback signal controlling the encoding parameters in the algorithm of the video codec.

53 Claims, 2 Drawing Sheets

METHOD AND APPARATUS FOR CONTROLLING ENCODING OF A DIGITAL VIDEO SIGNAL ACCORDING TO MONITORED PARAMETERS OF A RADIO FREQUENCY COMMUNICATION SIGNAL

BACKGROUND OF THE INVENTION

The present invention relates to a method and apparatus for digital video coding, and more particularly to digital video coding for wireless communication.

Digital video offers a great many advantages over traditional analog systems, supporting services such as video telephony and multi-media applications. However, a key problem of digital video when compared to a analog systems is the demand it places on communications and storage resources. For example, a bandwidth of approximately 160 Mbps is required in order to transmit a broadcast quality video, which compares with a bandwidth of approximately 5 MHz for comparable quality analog video. Thus, to be able to use digital video the digital signal requires reduction of the quantity of data.

Data reduction is achieved by using compression techniques to remove redundant data while still retaining sufficient information to allow the original image to be reproduced with an acceptable quality. There are two types of redundancy in video signals: spatial and temporal. For the coding of images, techniques which exploit spatial redundancy only are termed intra-frame (i.e., they treat each frame separately), while those used to exploit temporal redundancy are termed inter-frame (i.e., they exploit similarities between frames), the latter invariably also exploit spatial redundancy.

Several coding techniques have been developed for redundancy removal, these include run length coding, conditional replenishment, transform coding, Huffman coding and differential phase code modulation (DPCM). Many of these are utilized in key standards such as JPEG, MPEG-1 and MPEG-2, and H.261/H.263. JPEG defines the form of compressed data streams for still images; MPEG/MPEG2 are for compression of moving pictures; H.261/H.263 have primarily been defined for video telephony applications employing low bit rate communications links (of the order of tens of kbit/s).

Video compression and expansion systems are often referred to as 'video codecs' inferring the ability to both encode and/or decode images. Current video telephony systems have primarily been designed for use in PSTN or packet networks, and are governed by ITU-T recommendations H.324, which covers low bit rate multimedia communication, and H.323, which covers video conferencing over traditional shared media local area networks. The video coding parameters of the algorithm controlling encoding in the video codec are normally selected on the basis of the relatively error free transmission channels these systems can provide. However, the video coding algorithms of video codecs are flexible in that they can allow selection of the coding parameters. This is particularly beneficial for transmission on channels which are prone to error. In such conditions the coding parameters can be modified so as to attempt to minimize the effect of transmission errors on the picture quality. Where errors have occurred in transmission, it has been found that the decoded video normally produces additional blockiness, annoying green and pink squares, temporal jerkiness and sometimes chequered patterns.

In existing systems, two parameters which are typically adjusted in encoding are the amount of intra-refresh information and frequency of start codes. In PSTN networks, the video codec starts the coding with a full intra-frame. Intra-frame pictures are coded without reference to other pictures which means that they contain all the information necessary for their reconstruction by the decoder and for this reason they are an essential entry point for access to a video sequence. Because the resolution of intra-frames is high, the compression rate is relatively low and therefore a full intra-frame places huge demands on the number of data bits required to define the picture. As a result, the transmission of a full intra on small bandwidth lines, and even using small buffers to minimize delays, takes large periods of time, to the extent that the decoder must freeze the previous picture on the screen for a while, in effect to allow the following picture to catch up. Thus, as an alternative approach, in succeeding frames, intra-frame information is updated (or refreshed) on sequential portions of the picture frames, rather than the whole picture frame typically on a block-by-block basis of 16×16 pixels, hence the picture is said to be intra-refreshed. If the rates at which the blocks are refreshed is slow (which it usually is in PSTN) transmission error artefacts on the image can live very long, and will vanish only when the erroneous block is intra-refreshed. In error prone networks, it is therefore necessary to increase the number of intra-refresh macro blocks in each frame, or the rate at which full intra frames are sent.

Another technique used to minimize the impact of transmission errors is to reduce the size of affected areas. Since the coded bit stream contains variable length coding (VLC) code words, an error in the bit stream in most cases causes the decoder to lose synchronization with VLC code words. The decoder can only continue decoding after receiving a fixed length distinct code word called a start code. Typically, start codes are found at the beginning of coded picture frames, however most video coding standards also allow start codes to be inserted elsewhere in a picture, for instance at the beginning of each row of macro blocks or even more often. Thus in order to reduce the size of the areas affected by transmission errors, start codes can be introduced in the picture at more frequent locations. The density of these start codes is a compromise between reduced picture quality owing to an increased number of header bits, and the size of the area which is affected by transmission errors. In error prone environments it is advantageous to sacrifice some visual image quality in order to reduce the image area affected by transmission errors.

The overall current approach is to pre-program intra-refresh information and start code parameters into the algorithm controlling the video codec depending on the anticipated level of transmission errors. Since these parameters can be varied in an encoder, if, for example, there is a high probability of losing a significant amount of information in a transmission then the intra-refresh information and start code parameters are sent more often. However with high C/I (carrier to interference) or C/N (carrier to noise ratio) levels relatively less intra-refresh or start code information is required, thus allowing for better image quality.

Insertion of additional intra-refresh data and start codes is reasonably effective for mitigating the effects of predictable transmissions errors, but these approaches are not without certain shortcomings. Principally, these shortcomings stem from the fact that actual transmission errors are not always predictable, and in situations where there is a wide margin between the predicted transmission error and the actual transmission error, the intra-refresh and start code parameters will not be consistent with the required level for these encoding parameters. For example, on one hand if the transmission errors are less than anticipated then the level of intra-refresh or start code information will be in excess of that required, and the excess will thus be redundant. On the other hand, if the transmission errors are much worse than those predicted, then the intra-refresh and start code information will be insufficient, and spread so widely both temporally and spatially in the decoded pictures that the result will be poor image quality. Coding parameters are thus set at an intermediate rate, but of course in this case image quality is compromised and thus not at an optimum.

Against this background, the present invention aims to address the problems arising from transmission errors on video coded signals.

SUMMARY OF THE INVENTION

Accordingly, and in a first aspect, the present invention provides a method of operating a digital video codec for providing encoded video data for radio communication between a portable radio communication apparatus and a radio communication network, the method comprising monitoring at least one criterion of the radio communication signal and providing a signal responsive to said at least one monitored criterion for controlling at least one output parameter of the digital video codec.

In an alternate expression of the invention, the signal provided responsive to said at least one monitored criterion controls at least one coding parameter of the algorithm for encoding the video data in the digital video codec.

By means of the invention, the coding parameters of the video coded signal and hence the quality of the received image can be optimized for any given condition of a transmission channel. In, for example, a good channel connection the image quality is enhanced because less intra-refresh information and other overhead information is required. On the other hand where the channel connection is poor, better image quality can be assured because more intra-refresh information can be provided and less enduring and wide spreading errors occur in the image. Furthermore, by providing signals for optimal selection of video coding parameters based on radio channel measurements the use of radio resources is more efficient.

In preferred embodiments of the invention, the at least one monitored criteria can be the received signal quality, and/or received signal strength, and/or the transmission power.

Advantageously, the signal responsive to said at least one monitored criteria is a feedback signal providing using H.245 control protocol.

It is preferred that during transmission of the radio communication signal by the radio communication network, the portable radio communication apparatus monitors received signal quality and/or received signal strength.

Advantageously, during transmission from the portable radio communication apparatus, the portable radio communication apparatus monitors transmission power.

In preferred embodiments of the invention, the at least one output parameters comprise intra-refresh data and/or start codes.

In a second aspect of the present invention there is provided apparatus for performing the method hereinbefore defined.

The invention extends to a digital video codec arranged to provide encoded video data for radio communication between a portable radio communication apparatus and a radio communication network, the video codec being operable to modify at least one coding parameter of the algorithm for encoding the video data in response to feedback signals associated with at least one monitored criterion of the radio communication signal.

BRIEF DESCRIPTION OF THE DRAWINGS

The present invention will now be described by way of example with reference to the accompanying drawings in which.

DETAILED DESCRIPTION OF THE DRAWINGS

Figure 1:
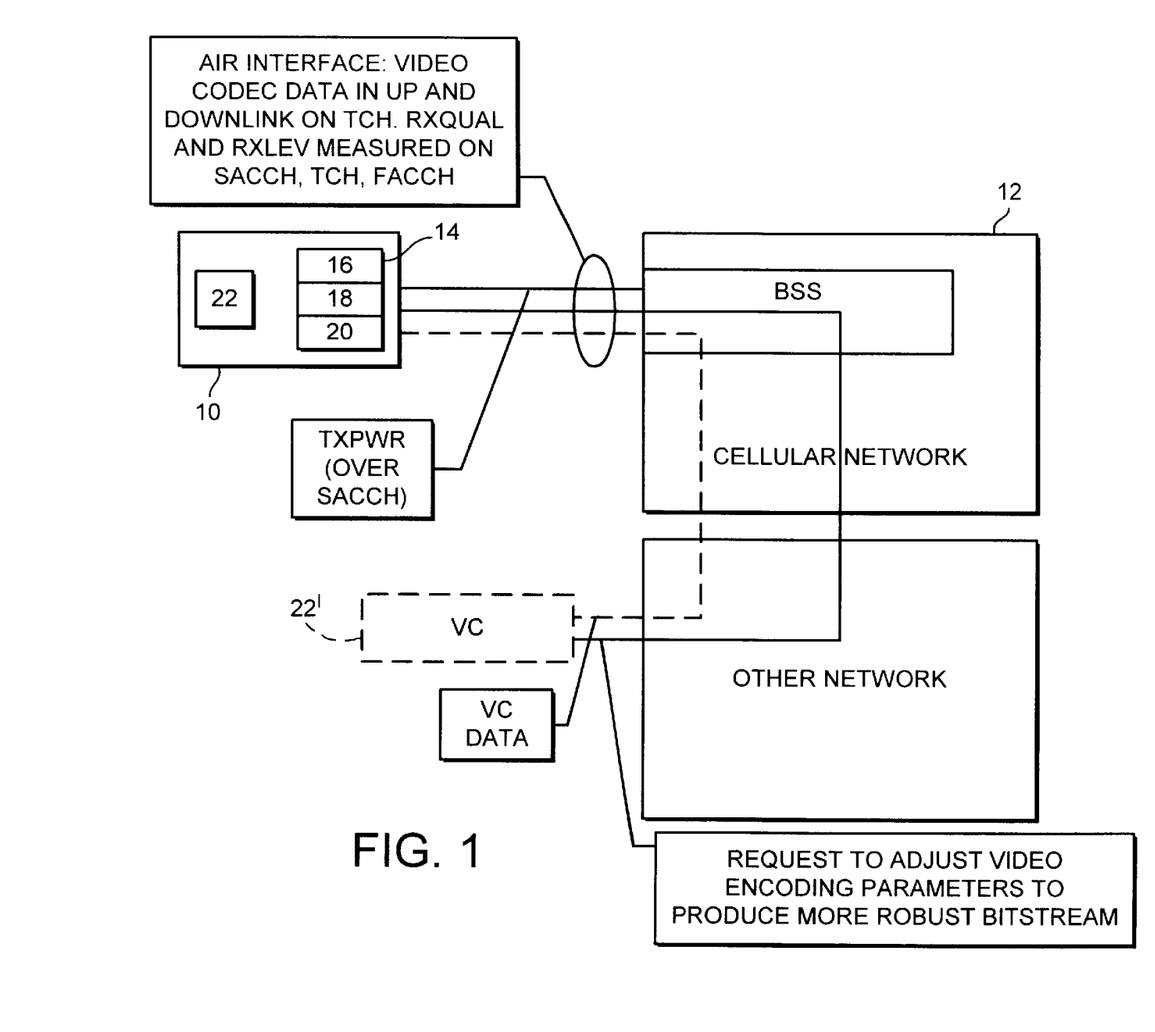
FIG. 1 is a schematic representation of the system according to at least a preferred embodiment of the present invention.

In the block diagram cellular telephone system shown in FIG. 1, a mobile station 10 is linked to operate in a cellular network 12, transferring data and digitized signals in a two way radio communication link. The cellular network 12 typically comprises an array of base stations which are linked together either directly or indirectly via mobile switching centers, and which enable information to be routed between mobile stations as well as landline telephones.

The mobile station 10 is equipped with the standard features associated with a mobile communication device: a keypad for dialing numbers, accepting and terminating a call, storing telephone numbers, and so on; a microphone and a loudspeaker; an antenna for radiating electromagnetic waves at transmission frequencies during transmission, and during reception for converting received electromagnetic waves at reception frequencies into electrical signals, and an RF block 14 comprising a receiver 16, synthesizers 18, and a transmitter 20. The mobile station 10 is further provided with a video codec 22 which, as explained above, can perform video compression (encode) and/or expansion (decode) for transmission and reception of video images. A video telephony system having full functionality also contains other related blocks such as audio codec, and multiplexer/demultiplexer which take care of combining the coded video and audio into a single bitstream and so on.

An alternative arrangement is shown in dashed lines in FIG. 1, in which the video codec 22' is remote from the mobile station 10. In such a situation, the video codec communicates (remotely) with the mobile station through the cellular or some other network.

Alternatively, it is envisaged that the mobile station may be a radio card and that the video codec is provided in a computer (e.g., portable computer) to which the radio card can be connected via, for example, a PCMCIA connection. In this case, instructions from a mobile station 10 may be sent to the video codec 22' over AT commands and the data transfer between the video codec and the mobile station may be performed over a V.80 connection.

It will be apparent that the transfer of video signals between a mobile station and a cellular network can occur in two directions: in one direction, the network transmits whilst the mobile station receives, this is known as the down-link direction; in the other direction, the mobile station transmits whilst the network receives, and this is known as the up-link direction. End-to end use refers to the situation in which two mobile stations are in communication with one another through the telecommunication network.

Figure 2:
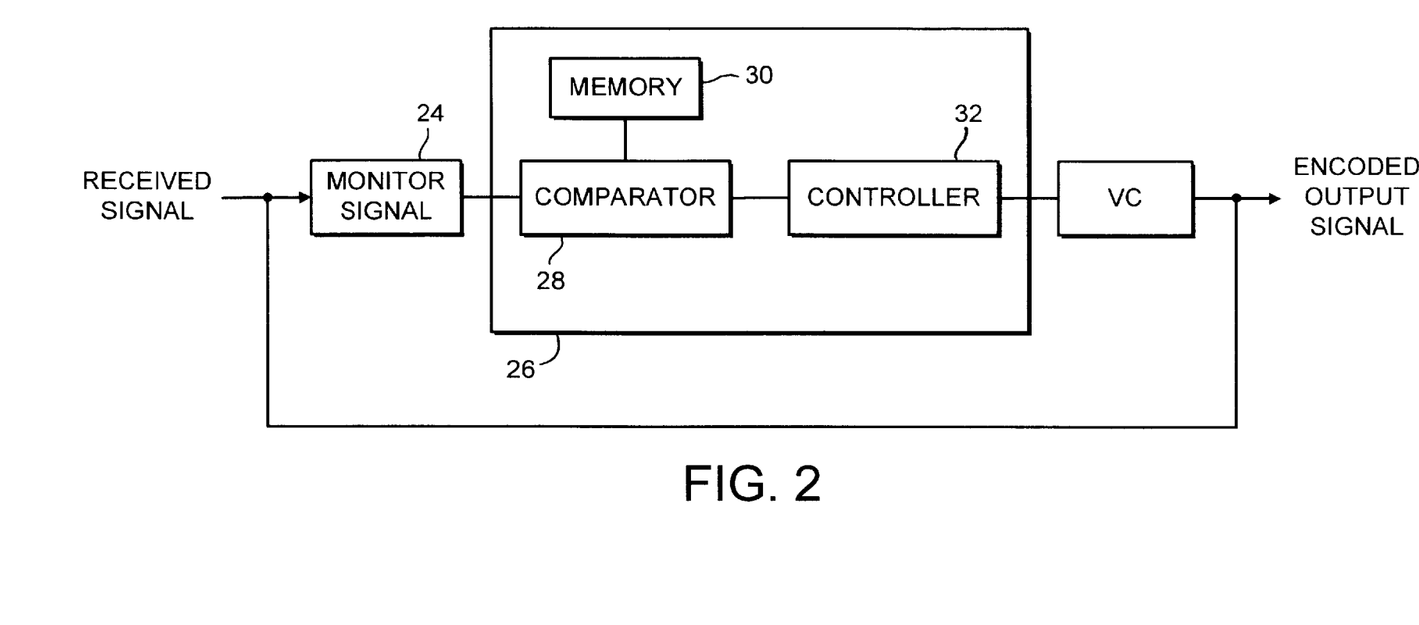
FIG. 2 is block diagram of one embodiment of the present invention.

A first embodiment of the present invention operating in the down-link direction will be described with reference to FIG. 2.

In down-link mode, the mobile station 10 receives data transmitted by the network 12 and continuously monitors at 24, in the preferred embodiment, the received signal quality and signal strength. In GSM these requirements are defined in GSM 05.08 and are used for example for handover decisions. The received signal quality and signal strength provides an indication of C/I (carrier to interference) and C/N (carrier to noise ratio).

In GSM 05.08 the received signal strength (or received signal level) of the serving base station is denoted by the two parameters: RXLEV_FULL_SERVING_CELL and RXLEV_SUB_SERVING_CELL. The received signal strength is referred to in this text as RXLEV, which may be RXLEV_FULL_SERVING_CELL or RXLEV_SUB_SERVING_CELL, depending on the use of discontinuous transmission (DTX) during the call.

Similarly in GSM 05.08 the received signal quality is denoted by RXQUAL_FULL_SERVING_CELL and RXQUAL_SUB_SERVING_CELL, depending on the use of DTX, and in this text is referred to by the term RXQUAL.

The signal power is measured by the receiver, and it is mapped to RXLEV values as presented in GSM 05.08. Whilst RXLEV may not always correlate with C/N, a low RXLEV value indicates low signal strength, hence low C/N on the radio path. High RXLEV does not necessarily indicate high C/N, because high RXLEV may be generated by high interference levels as well.

RXQUAL is an estimate of bit error rate (BER) in the received signal before channel decoding. Mapping between BER and RXQUAL is described in GSM 05.08. High BER values are caused either by low C/N or by low C/I, while lower BER values coincide with either higher C/N or high C/I.

In the GSM system, RXLEV is usually compared to signal strengths of the neighbouring base stations and used as the criterion for inter-cell handover. RXQUAL is typically used as the criterion for intra-cell channel changes.

In the presented invention, it is possible to detect low C/I and low C/N from RXQUAL alone, but RXLEV information could also be utilized to improve accuracy.

The output value of the monitored signal, i.e., a value indicative of the received signal's quality and strength, is fed to a control system 26. It should be noted that the control system 26 can be part of the mobile station 10, or alternatively it can be located in the network 12, in which case the monitored signal is transmitted by the mobile station 10.

The control system 26 comprises a comparator 28, memory means 30 associated with the comparator 28, and a controller 32 downstream of the comparator 28. The output value of the monitored signal is fed into the comparator 28 which compares this value with values for signal quality and strength taken from the memory means 30. The memory means 30 contains a store of values for signal quality and strength correlated to acceptable images when decoded. The store of values includes upper limits and lower limits of operation, thereby defining preferred operating ranges. These would normally be factory set but could be user defined. The comparison made in the comparator 28 provides information as to whether the monitored values of the received signal are within the preferred operating ranges, above them or below them. For example, if transmission errors are high then the received signal would be relatively weak and the comparator 28, comparing this against stored values, would output a result reflecting this.

The output from the comparator 28 is fed into the controller 32. On the basis of the result of the comparator 28, the controller 32 decides whether or not to change the coding parameters of the transmitting video codec. If the result from the comparator 28 is that the monitored received signal is within its preferred operating range then the controller 32 directs no changes in the coding parameters. On the other hand, if the monitored signal is outside its preferred operating range then the controller 32 commands a change in the operation of the video codec. For example, in the case of high transmission error the controller 32 commands the encoding video codec to produce a more robust bit stream with more intra-refresh information and/or start codes. Hence, the quality of the image generated by the decoding video codec will be much improved. In this way, in down-link mode, the mobile station has adaptive control of the encoding parameters of the transmitting video codec.

The transmitting video codec may be located in the network itself, or, in an end-to-end communication would be located in the transmitting mobile station. One possible means for the receiving mobile station to command a change in operating performance of the transmitting video codec in another mobile station is to use H.245 Control Protocol specification for Multimedia Communication.

In the latter instance, the command to change the operating performance of the transmitting video codec are sent from the receiving mobile station to the network, and this command is then fed by the network to the remote transmitting mobile station. Accordingly, it is possible for a first mobile station to affect the video coding parameters of a second mobile station by monitoring the condition of the radio link on its side of the network and providing feedback information thereon.

In the up-link direction in which the mobile station transmits and the cellular network receives, a similar process may be employed whereby the signal received at the base station is used as an indication of the quality of the link, and which is monitored and then fed back to the mobile station for modifying the operation of the video codec.

However, currently in GSM it is not possible for the mobile station directly to obtain information about the receive quality levels measured at the base station. Nor is this information delivered from the cellular network to the mobile station. Thus in order to obtain a measure of the quality of the up-link connection, use is made of the up-link power level. In GSM this is defined in GSM 05.08. The up-link power level is a parameter that is commanded by the network. So at times when the signal level and quality of the up-link transmission deteriorates, the network commands the transmission power of the mobile station to be increased. This request for higher transmission power is discerned by the mobile station which in turn triggers an increase in the intra-refresh and start code parameters of the video codec, provided that the change in power level is deemed to be high enough. In this regard, the mobile station is provided with look-up tables stored in the memory means which contain information on the correlation between transmission power levels and the appropriate density of coding parameters in a coding algorithm.

Returning to FIG. 1, TXPWR refers to the regularly transmitted network request to increase or decrease transmitter power. This is defined in GSM 05.08 as parameter MS_TXPWR_REQUEST. Alternatively or in addition, use could also be made of other power level related information sent by the network, such as power level commands in connection with handover.

The box in FIG. 1 labeled 'other network' can also be an ascending network ISDN, PSTN, or even the same network where the mobile station with the video codec is connected. As mentioned above, it will be appreciated that received signal quality and received signal strength could also be used in the network side with a link between the network and video codec in the mobile station. In principle, it is possible to store the intra-frames in a dedicated memory unit in the network for example in the base station. Stored frames could then be retransmitted whenever the radio interface parameters indicated that the C/I or C/N ratio is low.

Whilst the invention has been described in the context of circuit switched transparent mode, the invention can be applied also in packet switched unacknowledged mode. The invention as such can be used in packet switched acknowledged and circuit switched non transparent mode. Of course in these cases there is the general penalty of harmful retransmission in a real time service. However in principal the invention itself is applicable irrespective of the way the radio interface is implemented. In addition to RXQUAL and RXLEV other parameters also can be used to determine the quality of the connection. These may include retransmission of signalling frames, number of lost frames, number of retransmissions of data frames on RLC layer in GPRS acknowledged mode. In GPRS the variance of the signal level (BL_VAR SIGN_VAR) could be one of the parameters to be measured. In addition, a further parameter which may be monitored may be that of the video signal itself. For example bit error rate in the received video stream as monitored by a demulitplexer in a multi-media terminal performing a cyclic redundancy check may be used as an indication for controlling the transmitting video codec.

Optionally, when an intra-frame is being transmitted by a mobile station and hand over takes place, the intra-frame can be retransmitted because the first one may be lost due to the hand over. The same also applies to other changes in the channel mode for example between GMSK and EDGE modulations. In down-link, the mobile station may request an extra intra-frame after every hand over or channel mode change because an intra-frame may have been lost in the down link direction.

It is envisaged that the present invention will be particularly beneficial in cases where the variation in the radio parameters becomes large. For example this happens in GSM with EDGE (Enhanced Data rates for GSM Evolution), because in EDGE the data quality may vary significantly. Also very frequent channel coding or modulation changes characteristic of EDGE destroy frames, thus it is advantageous to increase the rate of intra-refresh and/or start code information when required.

The present invention may be embodied in other specific forms without departing from its essential attributes. Accordingly reference should be made to the appended claims and other general statement's herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalization thereof irrespective of whether or not it relates to the claimed invention or mitigates any or all of the problems addressed.

The appended abstract as filed herewith is included in the specification by reference.

What is claimed is:

1. A system for controlling the source coding of a digital video signal by a video encoder, the digital video signal being encoded by the video encoder in accordance with predetermined encoding parameters so as to provide an encoded video data signal for transmission by means of a radio frequency communication signal by a first radio communication device to a second radio communication device, the radio frequency communication signal being received at the second radio communication device, the system comprising:

means for monitoring at least one parameter indicative of a property of the radio frequency communication signal received at the second radio communication device;

means for forming a feed back signal responsive to the at least one monitored parameter for controlling at least one of the predetermined encoding parameters used by the video encoder in the source coding of the digital video signal;

means for transmitting the feedback signal from the second radio communication device to the first radio communication device;

means for receiving the feedback signal at the first radio communication device;

means for providing the feedback signal received at the first radio communication device to the video encoder; and means for modifying at least one of the pre-determined encoding parameters used by the video encoder in the source coding of the digital video signal.

2. A system according to claim 1, further comprising a third radio communication device, wherein the video encoder is located in connection with the third radio communication device, and wherein the first radio communication device is a radio communication network, and the second radio communication device and the third radio communication device are a portable radio communication apparatus or a radio card for use in connection with a personal computer.

3. A system according to claim 2, wherein the third radio communication device comprises means for transmitting a digital video signal encoded by the video encoder as a radio frequency communication signal to the first radio communication device and the first radio communication device comprises means for transmitting the digital video signal encoded by the video encoder as a radio frequency communication signal to the second radio communication device.

4. A system according to claim 3, wherein the first radio communication device comprises means for transmitting the feedback signal responsive to the at least one monitored parameter transmitted from the second radio communication device to the first radio communication device further from the first radio communication device to the third radio communication device.

5. A system according to claim 4, wherein transmission of the feedback signal responsive to the at least one monitored parameter from the second radio communication device to the first radio communication device and further from the first radio communication device to the third radio communication device is arranged to be performed by an end-to-end control protocol.

6. A system according to claim 5, wherein the end-to-end control protocol is an H.245 control protocol.

7. A system according to claim 1, further comprising means for measuring a signal quality of the radio frequency communication signal received at the second radio communication device as the at least one parameter indicative of a property of the radio frequency communication signal.

8. A system according to claim 1, further comprising means for measuring a signal strength of the radio frequency communication signal received at the second radio communication device as the at least one parameter indicative of a property of the radio frequency communication signal.

9. A system according to claim 1, wherein the second communication device is a radio communication network, and the first radio communication device is a portable radio communication apparatus or a radio card for use in connection with a personal computer.

10. A system according to claim 1, wherein the first radio communication device is a radio communication network and the second radio communication device is a portable radio communication apparatus or a radio card for use in connection with a personal computer.

11. A system according to claim 1 wherein the at least one of the predetermined encoding parameters used by the video encoder in the source coding is arranged to control the frequency of intra-refresh data in the encoded video data.

12. A system according to claim 1 wherein the at least one of the predetermined encoding parameters used by the video encoder in the source coding is arranged to control the frequency of start codes in the encoded video data.

13. A system according to claim 1, wherein the video encoder is remote from the first radio communication device.

14. A system according to claim 13, wherein the video encoder is located in a personal computer in connection with the first radio communication device.

15. A system according to claim 1, wherein the video encoder is located in the first radio communication device.

16. A method of controlling the source coding of a digital video signal by a video encoder, in which the digital video signal is encoded by the video encoder in accordance with predetermined encoding parameters so as to provide an encoded video data signal for transmission by means of a radio frequency communication signal by a first radio communication device to a second radio communication device, the radio frequency communication signal being received at the second radio communication device, the method comprising the steps of:
   monitoring at least one parameter indicative of a property of the radio frequency communication signal received at the second radio communication device;
   responsive to the at least one monitored parameter, forming a feedback signal for controlling at least one of the predetermined encoding parameters used by the video encoder in the source coding of the digital video signal;
   transmitting the feedback signal from the second radio communication device to the first radio communication device;
   receiving the feedback signal at the first radio communication device;
   providing the feedback signal received at the first radio communication device to the video encoder; and
   modifying at least one of the predetermined encoding parameters used by the video encoder in the source coding of the digital video signal.

17. A method according to claim 16, wherein the video encoder is located in connection with a third radio communication device, the first radio communication device is a radio communication network, and the second radio communication device and the third radio communication device are a portable radio communication apparatus or a radio card for use in connection with a personal computer.

18. A method according to claim 17, wherein the digital video signal is encoded by the video encoder and is transmitted as a radio frequency communication signal from the third radio communication device to the first radio communication device and further from the first radio communication device to the second radio communication device.

19. A method, according to claim 18, wherein the feedback signal responsive to the at least one monitored parameter transmitted from the second radio communication device to the first radio communication device is further transmitted from the first radio communication device to the third radio communication device.

20. A method according to claim 19, wherein the transmission of the feedback signal responsive to the at least one monitored parameter from the second radio communication device to the first radio communication device and further from the first radio communication device to the third radio communication device is performed by an end-to-end control protocol.

21. A method according to claim 20, wherein the end-to-end control protocol is an H.245 control protocol.

22. A method according to claim 16, wherein the second communication device is a radio communication network, and the first radio communication device is a portable radio communication apparatus or a radio card for use in connection with a personal computer.

23. A method according to claim 16, wherein the first radio communication device is a radio communication network and the second radio communication device is a portable radio communication apparatus or a radio card for use in connection with a personal computer.

24. A method according to claim 16, wherein the at least one parameter indicative of a property of the radio frequency communication signal monitored at the second radio communication device is a measure of received signal quality.

25. A method according to claim 16, wherein the at least one parameter indicative of a property of the radio frequency communication signal monitored at the second radio communication device is a measure of received signal strength.

26. A method according to claim 16, wherein the at least one of the predetermined encoding parameters used by the video encoder in the source coding controls the frequency of intra-refresh data in the encoded video data.

27. A method according to claim 16, wherein the at least one of the predetermined encoding parameters used by the video encoder in the source coding controls the frequency of start codes in the encoded video data.

28. A method according to claim 16, wherein the video encoder is remote from the first radio communication device.

29. A method according to claim 28, wherein the video encoder is located in a personal computer in connection with the first radio communication device.

30. A method according to claim 16, wherein the video encoder is located in the first radio communication device.

31. An apparatus for controlling the source coding of a digital video signal by a video encoder, the digital video signal being encoded by the video encoder in accordance with predetermined encoding parameters so as to provide an encoded video data signal for transmission by means of a radio frequency communication signal by a first radio communication device to a second radio communication device, the radio frequency communication signal being received at the second radio communication device, wherein the apparatus is located in the second radio communication device, the apparatus comprising:

means for monitoring at least one parameter indicative of a property of the radio frequency communication signal received at the second radio communication device; and means for forming a feedback signal responsive to the at least one monitored parameter for controlling at least one of the predetermined encoding parameters used by the video encoder in the source coding of the digital video signal.

32. An apparatus according to claim 31, further comprising means for measuring a signal quality of the radio frequency communication signal received at the second radio communication device as the at least one parameter indicative of a property of the radio frequency communication signal.

33. An apparatus according to claim 31, further comprising means for measuring a signal strength of the radio frequency communication signal received at the second radio communication device as the at least one parameter indicative of a property of the radio frequency communication signal.

34. A system for controlling encoding of a digital video signal, the digital video signal being encoded by a video encoder and transmitted by means of a radio frequency communication signal by a first radio communication device, the radio frequency communication signal being received by a second radio communication device, the system comprising:

means for monitoring at least one parameter indicative of a property of the radio frequency communication signal at the first radio communication device;

means for forming a feedback signal responsive to the at least one monitored parameter indicative of a property of the radio frequency communication signal for controlling at least one encoding parameter of the video encoder; and means for providing the feedback signal to the video encoder to control the encoding of the digital video signal.

35. A system according to claim 34, wherein the means for monitoring at least one parameter indicative of a property of the radio frequency signal at the first radio communication device comprises means responsive to a power control command received at the first radio communication device.

36. A system according to claim 34, wherein the means for monitoring at least one parameter indicative of a property of the radio frequency signal at the first radio communication device comprises means for measuring a transmission power of the radio frequency communication signal.

37. A system according to claim 34, wherein the second communication device is a radio communication network, and the first radio communication device is a portable radio communication apparatus or a radio card for use in connection with a personal computer.

38. A system according to claim 34 wherein the at least one encoding parameter of the video encoder is arranged to control the frequency of intra-refresh data in the encoded video data.

39. A system according to claim 34 wherein the at least one encoding parameter of the video encoder is arranged to control the frequency of start codes in the encoded video data.

40. A method of controlling encoding of a digital video signal, in which the digital video signal is encoded by a video encoder and transmitted by means of a radio frequency communication signal by a first radio communication device, the radio frequency communication signal being received by a second radio communication device, the method comprising the steps of:

monitoring at least one parameter indicative of a property of the radio frequency communication signal at the first radio communication device;

responsive to the at least one monitored parameter, forming a feedback signal for controlling at least one encoding parameter of the video encoder; and providing the feedback signal to the video encoder to control the encoding of the digital video signal.

41. A method according to claim 40, wherein the second communication device is a radio communication network, and the first radio communication device is a portable radio communication apparatus or a radio card for use in connection with a personal computer.

42. A method according to claim 40, wherein the first radio communication device is a radio communication network and the second radio communication device is a portable radio communication apparatus or a radio card for use in connection with a personal computer.

43. A method according to claim 40, wherein the at least one parameter indicative of a property of the radio frequency communication signal monitored at the first radio communication device is a power control command received at the first radio communication device.

44. A method according to claim 40, wherein the at least one parameter indicative of a property of the radio frequency communication signal monitored at the first radio communication device is a measure of transmitted signal power.

45. A method according to claim 40, wherein the at least one encoding parameter of the video encoder controls the frequency of intra-refresh data in the encoded video data.

46. A method according to claim 40, wherein the at least one encoding parameter of the video encoder controls the frequency of start codes in the encoded video data.

47. A method according to claim 40, wherein the video encoder is remote from the first radio communication device.

48. A method according to claim 47, wherein the video encoder is located in a personal computer in connection with the first radio communication device.

49. A method according to claim 40, wherein the video encoder is located in the first radio communication device.

50. An apparatus for controlling encoding of a digital video signal, the digital video signal being encoded by a video encoder and transmitted by means of a radio frequency communication signal by a first radio communication device, the radio frequency communication signal being received by a second radio communication device, wherein the apparatus is located in the first radio communication device, the apparatus comprising:

means for monitoring at least one parameter indicative of a property of the radio frequency communication signal at the first radio communication device; and means for forming a feedback signal responsive to the at least one monitored parameter indicative of a property of the radio communication signal for controlling at least one encoding parameter of the video encoder.

51. An apparatus according to claim 50, wherein the means for monitoring at least one parameter indicative of a property of the radio frequency signal at the first radio communication device comprises means responsive to a power control command received at the first radio communication device.

52. An apparatus according to claim 50, wherein the means for monitoring at least one parameter indicative of a property of the radio frequency signal at the first radio communication device comprises means for measuring a transmission power of the radio frequency communication signal.

53. A digital video encoder comprising encoder means for source coding of a digital video signal, the digital video signal being encoded by the encoder means in accordance with predetermined encoding parameters so as to provide an encoded video data signal for transmission by means of a radio communication signal by a first radio communication device to a second radio communication device, the encoder means being operable to respond to feedback signals based on at least one monitored parameter indicative of a property of the radio frequency communication signal and to modify at least one of the pre-determined encoding parameters used by the video encoder in the source coding of the digital video signal.

* * * * *

UNITED STATES PATENT AND TRADEMARK OFFICE
CERTIFICATE OF CORRECTION

PATENT NO. : 6,611,674 B1
DATED : August 26, 2003
INVENTOR(S) : Jokimies et al.

It is certified that error appears in the above-identified patent and that said Letters Patent is hereby corrected as shown below:

<u>Title page,</u>
Item [30], Foreign Application Priority Data,
"9817292" should read -- 9817292.7 --

Signed and Sealed this

Second Day of March, 2004

JON W. DUDAS
*Acting Director of the United States Patent and Trademark Office*